(12) United States Patent
Hognaland et al.

(10) Patent No.: US 10,660,438 B2
(45) Date of Patent: May 26, 2020

(54) LEVELING FOOT

(71) Applicant: Autostore Technology AS, Nedre Vats (NO)

(72) Inventors: Ingvar Hognaland, Nedre Vats (NO); Ivar Fjeldheim, Haugesund (NO); Trond Austrheim, Etne (NO); Borge Bekken, Haugesund (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/300,063

(22) PCT Filed: May 18, 2017

(86) PCT No.: PCT/EP2017/062024
§ 371 (c)(1),
(2) Date: Nov. 9, 2018

(87) PCT Pub. No.: WO2017/198784
PCT Pub. Date: Nov. 23, 2017

(65) Prior Publication Data
US 2019/0142160 A1    May 16, 2019

(30) Foreign Application Priority Data

May 20, 2016    (NO) .................................... 20160849

(51) Int. Cl.
*A47B 91/02* (2006.01)
*F16M 7/00* (2006.01)
*A47B 91/16* (2006.01)

(52) U.S. Cl.
CPC .............. *A47B 91/02* (2013.01); *A47B 91/16* (2013.01); *F16M 7/00* (2013.01)

(58) Field of Classification Search
CPC . A47B 91/02; A47B 91/16; A47B 2200/0051; A47B 9/00; A47B 9/04;
(Continued)

(56) References Cited

U.S. PATENT DOCUMENTS 1,125,807 A * 1/1915 Brown ................... A47B 91/02
                                                      248/188.5
2,384,020 A * 9/1945 Farson ................. A47B 91/028
                                                      248/188.5
(Continued)

FOREIGN PATENT DOCUMENTS

KR       20140122920 A    10/2014
WO    WO2012/004690 A1     1/2012

*Primary Examiner* — Christopher Garft
(74) *Attorney, Agent, or Firm* — Christian D. Abel

(57) ABSTRACT

A leveling foot having a base section with a raised, hollow column. A spring is arranged in the hollow column. A moveable top piece engages the column, and is movable in the vertical direction against the force of the spring. The top piece is slightly larger than the column, such that side walls of the top piece overlap the sides of the column when the spring is compressed. The bottom edges of the side walls of the top piece are angled. A generally U-shaped wedge device is provided that may be pressed into engagement with the base section, whereby a leg of the U engages each side of the column. The top surfaces of the legs of the U-shaped device are angled in the form of wedges, the angles of the top surfaces of the legs corresponding to the angles of the side walls of the movable top piece, such that the side walls of the top piece will rest upon the angled top surfaces of the legs of the wedge device when the top piece is under load.

4 Claims, 6 Drawing Sheets

(58) Field of Classification Search
CPC .... A47B 9/12; F16M 7/00; A47C 3/40; E06C 7/426; E06C 7/42; F25D 2323/0011; D06F 39/125
USPC .................................. 248/188.2–188.3, 188.5
See application file for complete search history.

(56) References Cited

U.S. PATENT DOCUMENTS

| | | | | | |
|---|---|---|---|---|---|
| 2,682,131 | A * | 6/1954 | Matter | .................... | A47B 91/16 248/188.3 |
| 2,695,147 | A * | 11/1954 | Castricone | ............ | D06F 39/125 248/649 |
| 2,932,122 | A * | 4/1960 | Matter | ................. | A47B 91/022 248/188.3 |
| 3,071,887 | A * | 1/1963 | Von Arb | ................. | F25D 23/00 248/651 |
| 3,177,035 | A * | 4/1965 | Halstrick | ................. | A47C 7/42 297/451.1 |
| 3,954,244 | A * | 5/1976 | Gopstein | ................. | B23Q 1/54 248/349.1 |
| 4,790,515 | A * | 12/1988 | Pocci | .................... | B23Q 1/0054 254/104 |
| 4,798,359 | A * | 1/1989 | Ball | ....................... | A47B 91/16 248/188.3 |
| 5,492,292 | A * | 2/1996 | Richards | ................. | A47B 91/02 248/188.2 |
| 6,471,187 | B1 * | 10/2002 | Dube | ..................... | A47B 91/02 254/131 |
| 7,475,996 | B2 * | 1/2009 | Hsu | ........................ | F16M 11/10 248/188.2 |
| 7,905,465 | B1 * | 3/2011 | Anwar | ..................... | F16M 7/00 248/188.2 |
| 8,579,242 | B2 * | 11/2013 | Huang | ................... | F16M 11/10 248/157 |
| 2002/0139908 | A1 * | 10/2002 | Oyama | ................. | D06F 39/125 248/188.8 |
| 2002/0139909 | A1 * | 10/2002 | Oyama | ................. | A47B 91/02 248/188.8 |
| 2005/0279895 | A1 * | 12/2005 | Lee | ........................ | A47B 91/04 248/188.8 |
| 2006/0202095 | A1 * | 9/2006 | Shao | ..................... | A47B 91/02 248/188.2 |
| 2007/0221809 | A1 * | 9/2007 | Lee | ........................ | A47B 91/02 248/371 |
| 2008/0289545 | A1 * | 11/2008 | Picchio | .................... | A47B 9/04 108/106 |
| 2009/0121099 | A1 * | 5/2009 | Chou | ................... | G03B 21/145 248/188.2 |
| 2010/0071599 | A1 * | 3/2010 | McEntire | ............... | A47B 13/02 108/50.11 |
| 2010/0264269 | A1 * | 10/2010 | Stoob | .................... | B64D 11/04 244/118.5 |
| 2012/0145844 | A1 * | 6/2012 | Glowinska | ............. | A47B 91/02 248/188.4 |
| 2012/0175475 | A1 * | 7/2012 | McErlane | ............. | A47B 91/02 248/188.2 |
| 2013/0112821 | A1 * | 5/2013 | Brooke | ................... | A47B 91/16 248/188.3 |
| 2013/0140426 | A1 * | 6/2013 | Nara | ..................... | G03B 21/145 248/688 |
| 2015/0289649 | A1 * | 10/2015 | Perrin | .................... | A47B 91/12 248/346.06 |
| 2015/0320213 | A1 * | 11/2015 | Sorrell | ................. | A47B 13/083 108/27 |
| 2016/0081474 | A1 * | 3/2016 | Basesme | ................. | A47B 91/02 248/188.4 |
| 2019/0142160 | A1 * | 5/2019 | Hognaland | ............ | A47B 91/16 248/188.2 |

* cited by examiner

LEVELING FOOT

FIELD OF THE INVENTION

The present invention relates to a leveling device, more particularly to a self-adjusting leveling foot for a storage grid or similar structures.

BACKGROUND OF THE INVENTION

There are many situations where it is necessary for a storage system, machine or other type of structure to be level. The problem is exacerbated when the floor on which the structure is installed is uneven. In cases where the structure is particularly heavy, a structure that is initially level may, do to the weight of the structure, become unlevel over time. It is therefore advantageous to provide a leveling foot under the structure that can be adjusted to achieve a level installation.

A known solution to the problem is to provide an adjustable foot of the type having a threaded shaft that can be extended or retracted to compensate for an uneven floor. Such solutions are well known in common household appliances, and can be illustrated by the device shown in U.S. Pat. No. 3,436,045. KR 2014 0122920 shows a height adjusting device wherein the height is adjusted as a second body is inserted into a first body comprising a spring wherein a stopper is inserted into the second body to limit movement between the two bodies. A disadvantage to such thread-based solutions is that the threads of the foot must bear the weight of the structure. This may lead to device failure where the structure is very heavy.

It also known to use a wedge to level a structure, its simplest form of the type described in U.S. Pat. No. 5,249,767. A simple wedge, however, is not self-adjusting and can be difficult or impossible to remove once the weight of the structure bears down upon the wedge.

Another known solution is described in U.S. Pat. No. 7,744,049. This device uses a spring to press open a foot attached to an elongated shaft. While this device has the advantage of being self adjusting during installation, it suffers from the disadvantage of using a thin shaft to bear the weight of the structure, which can lead to failure when the structure is particularly heavy.

SUMMARY OF THE INVENTION

It is therefore an object of the present invention to provide a self-adjusting leveling foot that overcomes the disadvantages of the prior art. According to one aspect, the present invention provides a robust leveling foot that can bear great weight. The present invention is particularly useful in an automated storage grid. Such storage systems comprise a grid structure in which storage bins are arranged in vertical stacks in a grid structure. The structure has a tops level, upon which are operated a plurality of automated bin-retrieval vehicles or robots. In order for such a storage system to function effectively, it is important that the storage grid is level. In the event the grid becomes unleveled over time, the present invention provides a simple mechanism for adjustment.

While the present invention is described in the context of a storage grid, it should be understood that the leveling foot of the invention has application in other situations. It may be used for shelving systems, machinery, appliances or any situation where a leveling foot may be employed.

The leveling foot of the present invention comprises a base section having a raised, hollow column. A spring is arranged in the hollow column. A moveable top piece engages the column, and is movable in the vertical direction against the force of the spring. The top piece is slightly larger than the column, such that side walls of the top piece overlap the sides of the column when the spring is compressed. The bottom edges of the side walls of the top piece are angled.

A generally U-shaped wedge device is provided that may be pressed into engagement with the base section, whereby a leg of the U engages each side of the column. The top surfaces of the legs of the U-shaped device are angled in the form of wedges, the angles of the top surfaces of the legs corresponding to the angles of the side walls of the movable top piece. In that manner, the side walls of the top piece will rest upon the angled top surfaces of the legs of the wedge device when the top piece is under load.

The inside surface of the legs of the U-shaped wedge device, and the outer surface of the raised column, are provided with mutually-engaging teeth that lock the wedge device in place, in a similar fashion to the manner in which plastic "strips" lock in place.

The movable top piece, according to one aspect of the invention, has structures designed to securely engage the underside of the structure to be leveled, for example a support leg of a storage grid. In one embodiment, the top piece has a raised protrusion that mates with a corresponding opening at the bottom of a leg. The top piece, in this preferred embodiment, is further provided with upwardly projecting wings that engage on the outside of the leg to provide lateral stability. It is to be understood, however, that other arrangements are possible for secure engagement of the movable top piece with the structure to be leveled. For example, the top piece could be provided with guide pins that engage guide holes underneath a structure to be leveled. The top piece could be provided with grooves or ridges that slidably engage corresponding grooves or ridges underneath the structure to be leveled, or the top piece could an integrated portion of the underside of the structure.

In use, a structure to be leveled is erected. A leveling foot according to the present invention is inserted at the corners or other appropriate locations. The top piece engages the underneath of the structure and the spring causes the leveling foot to expand to fill any gap created by uneven flooring. When the structure is leveled, the U-shaped wedge device is inserted, and pressed forward until the upper surface of the legs of the wedge engage with the angled lower surfaces of the side walls of the movable top piece. The teeth of the wedge and the column lock the wedge in place. In the event the floor were to sink later in the life of the structure, the wedge device can simple be pressed further forward to again achieve a stable base of support. Given that the leveling foot is manufactured from a robust material, the leveling foot of the device can bear a substantial weight, as the side walls rest in a stable manner upon the wedge device. When removing the leveling foot, the wedge device can be easily removed by spreading apart the legs of the U-shaped device until the teeth no longer engage with the teeth of the column.

BRIEF DESCRIPTION OF THE DRAWINGS

The invention will be described in detail with reference to the drawings, where.

DETAILED DESCRIPTION

Figure 1:
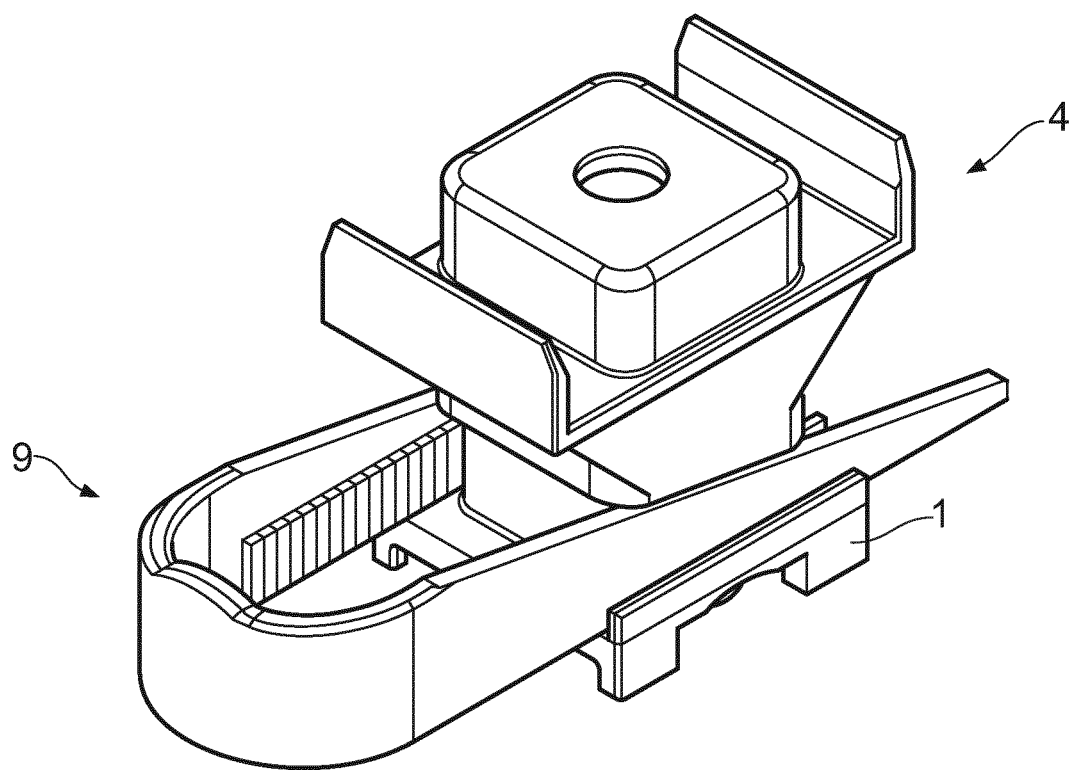
FIG. 1 is a perspective view of the invention
Figure 2:
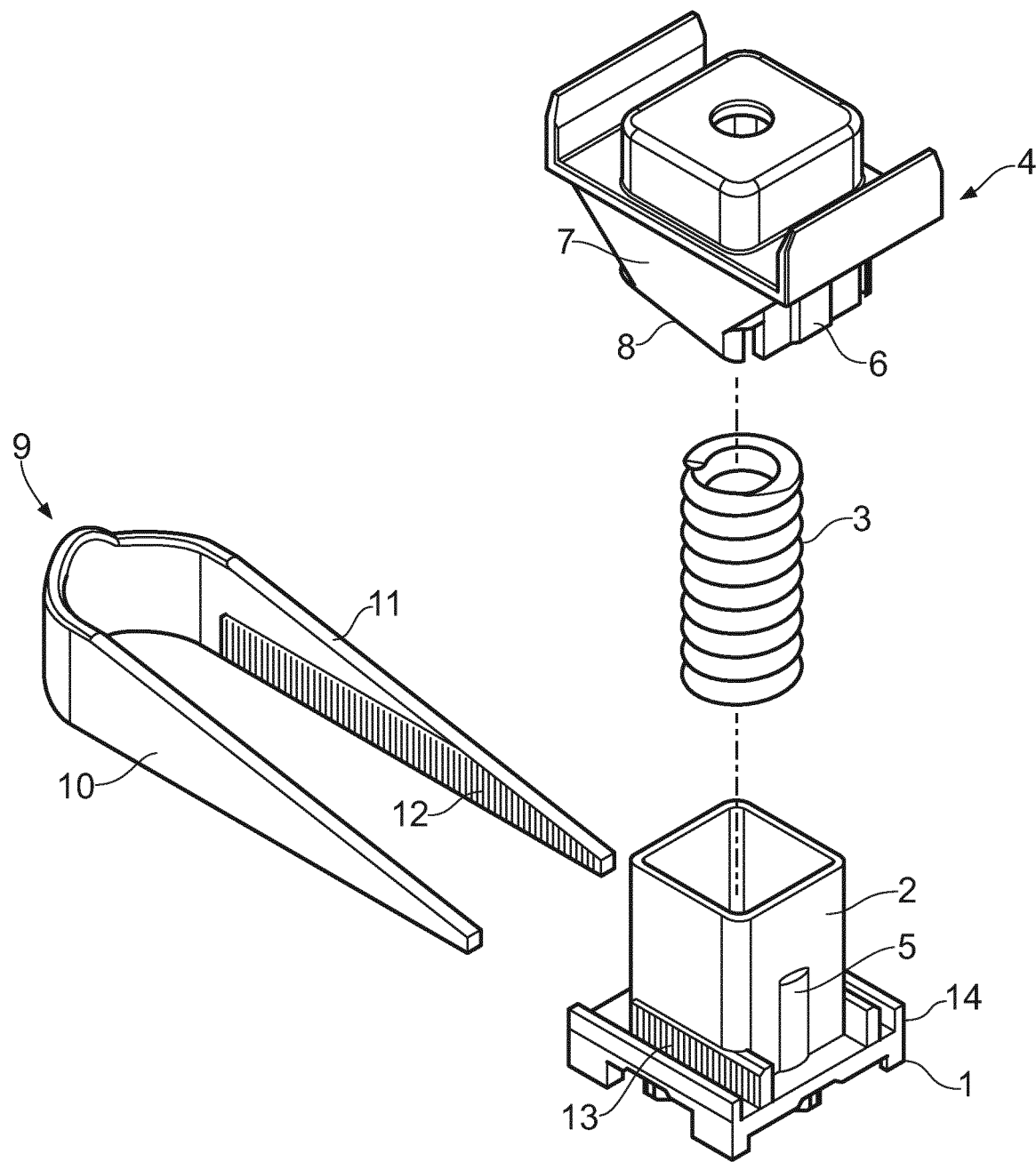
FIG. 2. is an exploded view of the invention
Figure 3:
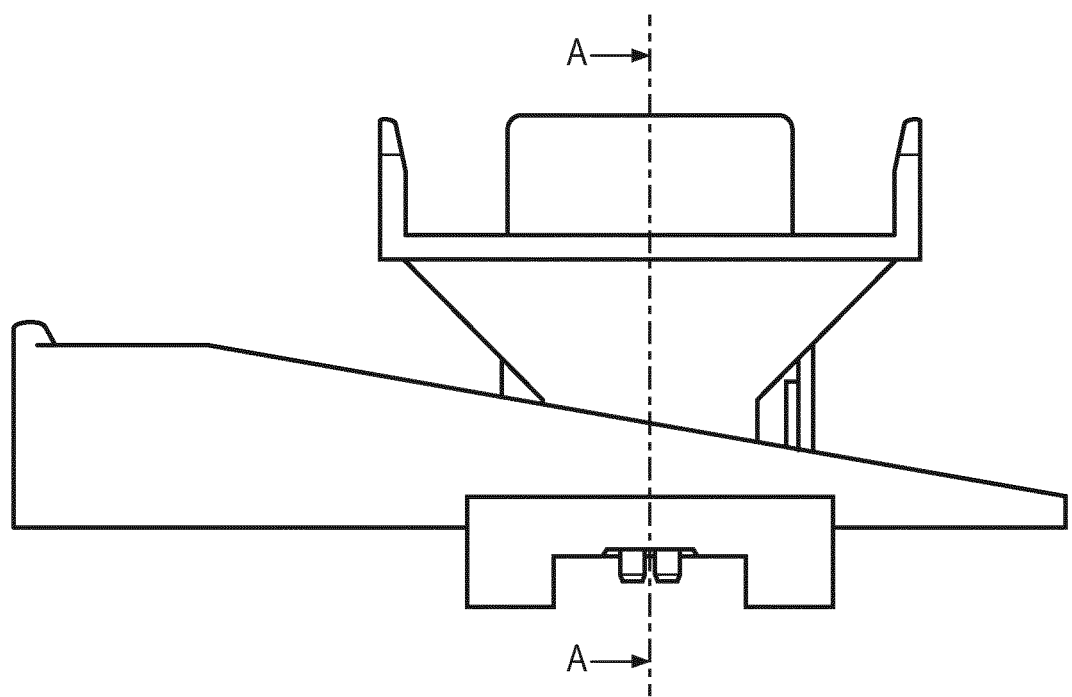
FIG. 3 is a side elevational view of the invention
Figure 4:
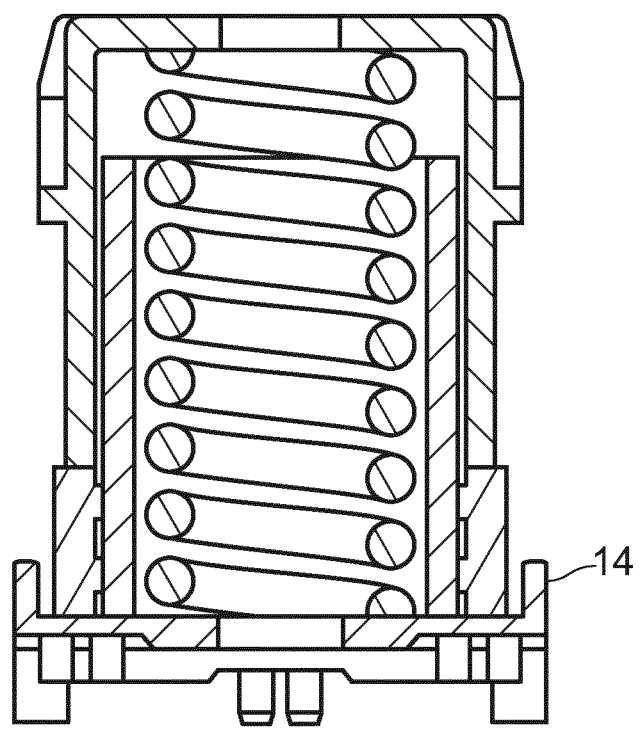
FIG. 4 is a side cross sectional view of the invention

As shown in FIGS. 1 and 2, the leveling foot of the invention comprises base section 1. In a preferred embodiment illustrated, the base section has a rectangular or square profile, but other shapes are possible within the scope of the invention. A hollow column 2 extends upwards from the base 1. A spring 3 is arranged in the hollow column 2. A movable top piece 4 is arranged about column 2. Top piece 4 is slightly larger than column 2 such that column 2 extends into a recess in top piece 4 when the top piece is pressed down against the resistance from spring 3. According to one aspect, column 2 has a guide ridge 5 that engages a guide recess 6 on top piece 4.

Top piece 4 has one or more side walls 7. The lower surface of guide wall 7 has an angled edge 8. The leveling foot further comprises a generally U-shaped wedge piece 9 with two legs 10. Legs 10 have an angled, upper surface 11, the angle of which corresponds to the angle of edge 8 of top piece 4. Along the inner surfaces of legs 10 are arranged a plurality of teeth 12 arranged to engage similar teeth 13 arranged on the sides of column 2.

When assembled, and under load, the leveling foot assumes the configuration shown in FIG. 1, whereby the top piece 4 is pressed down against the resistance of spring 3. Wedge piece 9 is inserted into engagement with column 2, the respective teeth locking the wedge piece in place. Angled edge 8 of the top piece will thus rest upon and be supported by upper edge 11 of the wedge piece. A pair of lips 14 on base 1 press legs 10 into engagement with column 2, so that the teeth remain locked together.

Figure 5:
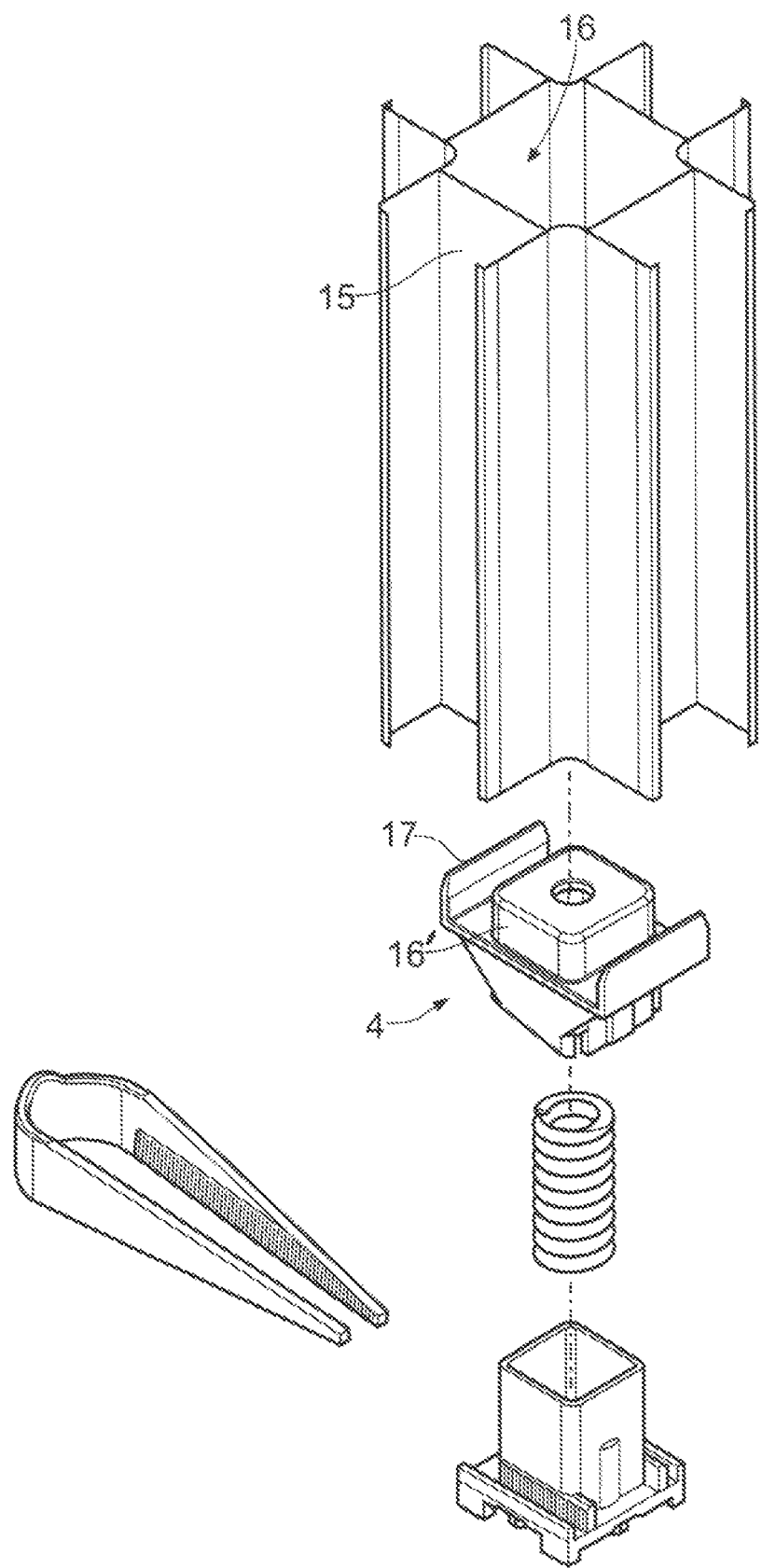
FIG. 5 is an exploded view of the invention, together with a support leg from a grid storage system
Figure 6:
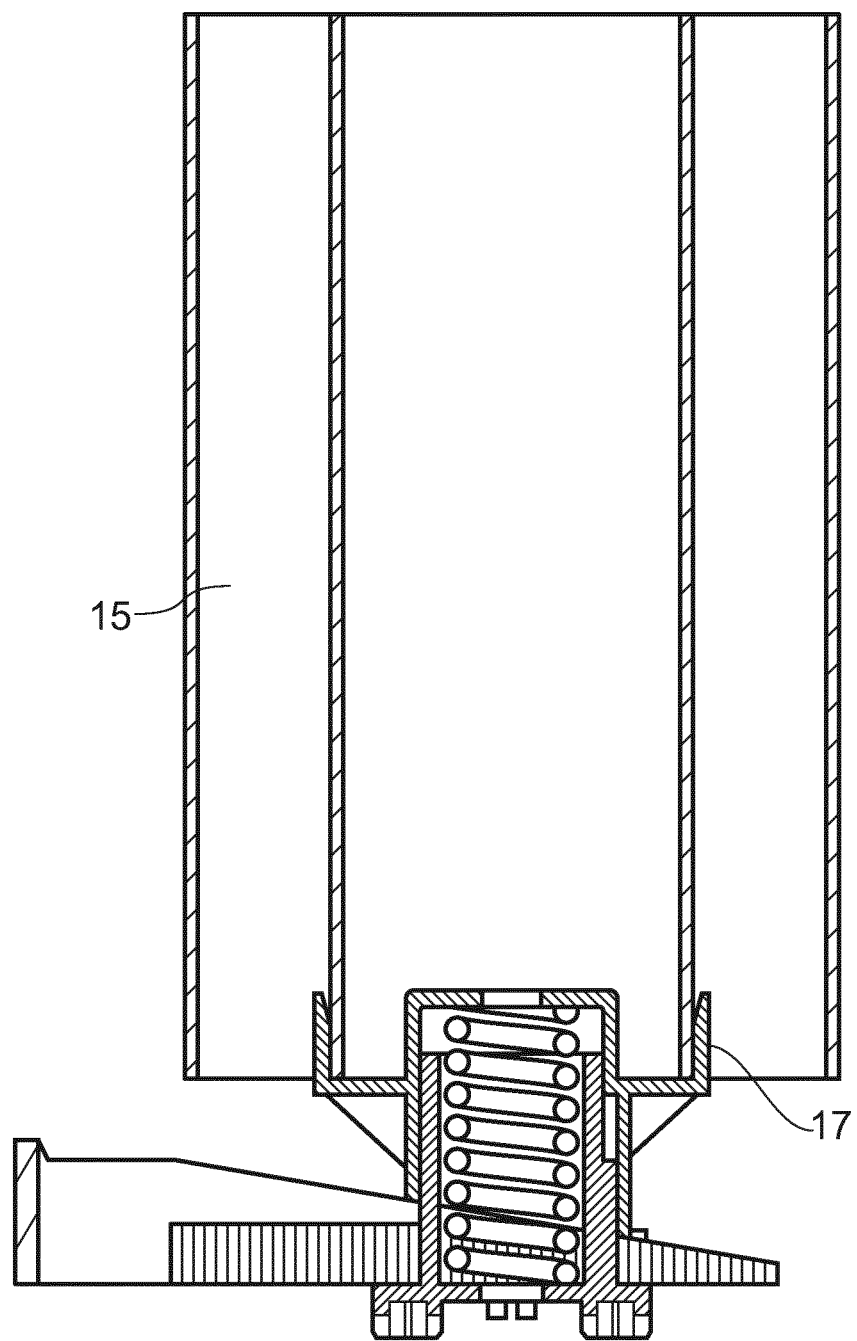
FIG. 6 is a side cross sectional view of the invention installed under a support leg

The invention may be used underneath any type of structure that requires leveling, with the force of spring 3 causing top piece 4 to extend and fill any gap caused by an uneven resting surface. According to one aspect, the device may be used to level a gridlike storage system. Such a storage system comprises vertical support legs connected by horizontal members. FIGS. 5 and 6 illustrate the leveling foot in use under such a support leg 15. In the illustrated embodiment, support leg 15 has a hollow center section 16 with a rectangular or square profile. Top piece 4 therefore is provided with a corresponding protrusion 16' that mates with the hollow center section 16. A pair of wings 17 extend up from top piece 4 and engage the outsides of support leg 15 to provide lateral stability, as shown in FIG. 6. In the event the support leg, or indeed the underside of another type of structure, has a different configuration, then top piece 4 can be provide with a complimentary configuration to engage such underside. Non-limiting examples include guide pins extending up from top piece 4 that engage guide holes, ridges that engage slots and the like. The top piece 4 could also be an integrated part of the underside of the structure.

The invention claimed is:

1. A leveling foot device for leveling a structure, comprising a spring arranged to expand the device to fill a gap between the structure to be leveled and a surface, wherein the foot comprises:
   a. a base section,
   b. a hollow column extending upwardly from the base section,
   c. the spring arranged in the hollow column,
   d. a movable top piece arranged to engage with the hollow column, said top piece movable in a vertical direction, wherein said top piece has an internal cavity for receiving the hollow column when the top piece is pressed downward against the force of spring,
   e. the movable top piece is equipped with one or more side walls, said side walls having a lower angled surface, and
   f. a generally U-shaped wedge device having two legs, a distance between the legs corresponding to a width of the hollow column, an upper surface of the two legs are wedge shaped, having an angle that corresponds with the lower angled surface of the one or more side walls, wherein the U-shaped wedge device comprises teeth arranged on inside surfaces of the legs of the U-shaped wedge device, said teeth arranged to lockingly engage with corresponding teeth arranged on the hollow column and
   whereby, when under load, the top piece is pressed downward such that the lower angled surface of the one or more side walls rest upon an angle of the upper surface of the legs of the U-shaped wedge device.

2. A leveling foot device according to claim 1, wherein the base section further comprises upwardly projecting lips spaced a distance from the teeth of the column, said lips arranged to press the teeth of legs of the U-shaped wedge device into engagement with the teeth of the column.

3. A leveling foot device according to one of the preceding claims, wherein the top piece is arranged to securely engage with an underside of the structure to be leveled.

4. A leveling foot device according to claim 3, wherein the structure to be leveled comprises support legs having an internal opening at the bottom of the legs, and wherein the top piece further comprises an upwardly extending protrusion corresponding to the opening of the legs, and further wherein the top piece comprises upwardly projecting wings spaced a distance from the upward protrusion, said distance from the upward protrusion corresponding to the width of the leg, whereby inside surfaces of the wings engage outside surfaces of the legs in order to provide lateral stability.

* * * * *